(12) United States Patent
Pantuso et al.

(10) Patent No.: US 6,839,852 B1
(45) Date of Patent: Jan. 4, 2005

(54) FIREWALL SYSTEM AND METHOD WITH NETWORK MAPPING CAPABILITIES

(75) Inventors: Joseph J. Pantuso, Springboro, OH (US); Shawn L. Brown, Troy, OH (US)

(73) Assignee: Networks Associates Technology, Inc., Santa Clara, CA (US)

( * ) Notice: Subject to any disclaimer, the term of this patent is extended or adjusted under 35 U.S.C. 154(b) by 276 days.

(21) Appl. No.: 10/071,549

(22) Filed: Feb. 8, 2002

(51) Int. Cl.[7] .................... H04L 9/00; H04K 1/00; G06F 15/173
(52) U.S. Cl. .............. 713/201; 713/188; 713/200; 380/258; 709/224
(58) Field of Search .................. 713/188, 200, 713/201; 380/258; 709/224

(56) References Cited

U.S. PATENT DOCUMENTS

| | | | | |
|---|---|---|---|---|
| 5,261,044 A | * | 11/1993 | Dev et al. .................. 345/855 |
| 5,812,668 A | * | 9/1998 | Weber ........................ 705/79 |
| 5,848,373 A | | 12/1998 | DeLorme et al. .......... 701/200 |
| 5,870,558 A | | 2/1999 | Branton, Jr. et al. .... 395/200.54 |
| 6,072,396 A | | 6/2000 | Gaukel .................... 340/573.4 |
| 6,100,806 A | | 8/2000 | Gaukel .................... 340/573.4 |
| 6,115,040 A | * | 9/2000 | Bladow et al. ........... 345/741 |
| 6,167,253 A | | 12/2000 | Farris et al. .............. 455/412 |
| 6,269,447 B1 | * | 7/2001 | Maloney et al. ........... 713/201 |
| 6,381,644 B2 | * | 4/2002 | Munguia et al. ........... 709/225 |
| 6,499,107 B1 | * | 12/2002 | Gleichauf et al. ......... 713/201 |
| 6,557,076 B1 | * | 4/2003 | Copeland et al. .......... 711/118 |
| 6,574,661 B1 | * | 6/2003 | Delano et al. ............. 709/223 |
| 6,594,786 B1 | * | 7/2003 | Connelly et al. ........... 714/50 |
| 6,664,978 B1 | * | 12/2003 | Kekic et al. ............... 345/733 |
| 6,681,232 B1 | * | 1/2004 | Sistanizadeh et al. ..... 707/104.1 |
| 6,691,165 B1 | * | 2/2004 | Bruck et al. .............. 709/227 |
| 2001/0006523 A1 | | 7/2001 | Kriens ...................... 370/401 |
| 2001/0007975 A1 | | 7/2001 | Nyberg, Jr. et al. ......... 705/1 |
| 2002/0049815 A1 | | 4/2002 | Dattatri .................... 709/206 |
| 2002/0082956 A1 | | 6/2002 | Peterson et al. ............ 705/28 |
| 2002/0103892 A1 | | 8/2002 | Rieger, III ................ 709/223 |
| 2002/0118796 A1 | | 8/2002 | Menard et al. ............. 379/45 |

* cited by examiner

Primary Examiner—Justin T. Darrow
Assistant Examiner—Kambiz Zand
(74) Attorney, Agent, or Firm—Zilka-Kotab, PC; Christopher J. Hamaty (57) ABSTRACT

A system, method and computer program product are provided for tracing a traffic event utilizing a firewall. Initially, a firewall is executed on a local computer. Next, traffic events between the local computer and a remote computer over a network are monitored utilizing the firewall. Further, the traffic events are displayed utilizing the firewall. In use, at least one of the traffic events is traced utilizing the firewall. Moreover, a map of the trace is displayed for effectively conveying information about the traffic event.

29 Claims, 6 Drawing Sheets

(PRIOR ART)

FIREWALL SYSTEM AND METHOD WITH NETWORK MAPPING CAPABILITIES

FIELD OF THE INVENTION

The present invention relates to firewalls, and more particularly to improving firewall functionality.

BACKGROUND OF THE INVENTION

In the space of just a few years, the Internet because it provides access to information, and the ability to publish information, in revolutionary ways—has emerged from relative obscurity to international prominence. Whereas in general an internet is a network of networks, the Internet is a global collection of interconnected local, mid-level, and wide-area networks that use the Internet Protocol (IP) as the network layer protocol. Whereas the Internet embraces many local- and wide-area networks, a given local- or wide-area network may or may not form part of the Internet.

As the Internet and its underlying technologies have become increasingly familiar, attention has become focused on Internet security and computer network security in general. With unprecedented access to information has also come unprecedented opportunities to gain unauthorized access to data, change data, destroy data, make unauthorized use of computer resources, interfere with the intended use of computer resources, etc. As experience has shown, the frontier of cyberspace has its share of scofflaws, resulting in increased efforts to protect the data, resources, and reputations of those embracing intranets and the Internet.

Firewalls are intended to shield data and resources from the potential ravages of computer network intruders. In essence, a firewall functions as a mechanism which monitors and controls the flow of data between two networks, or a network and a device. All communications, e.g., data packets, which flow between the networks in either direction must pass through the firewall; otherwise, security is circumvented. The firewall selectively permits the communications to pass from one network to another network or device, to provide bi-directional security.

Recently, there has been much work on software applications referred to as "personal firewalls." These applications are typically installed on a computer or any other computing device for protecting against unsecured networks coupled thereto. During use of such personal firewalls, network traffic is monitored and filtered based on a predetermined set of rules. Such rules may include any filtering criteria that protect the device. For example, such criteria may result in the prevention of computers having certain IP addresses from accessing the protected device, precluding access to certain ports associated with the protected device, the prevention of certain applications accessing the protected device, etc. During use, a vast number of events may occur where network traffic is prevented based on the filtering criteria.

Often, a user may wish to monitor the events to assess the current state of security of the device for the purposes of modifying the filtering criteria in the foregoing manner. Often information of interest when analyzing such events includes a source of an attempt to access the protected device, and the network segments that were traversed to access the protected device. Unfortunately, typical personal firewalls merely list IP address associated with the source of the attempts and possibly names of network segments. This alphanumeric listing approach is cumbersome and fails to convey the information of interest intuitively.

There is thus a need for an interface system and method capable of effectively conveying information associated with firewall events.

DISCLOSURE OF THE INVENTION

A system, method and computer program product are provided for tracing a traffic event utilizing a firewall. Initially, a firewall is executed on a local computer. Next, traffic events between the local computer and a remote computer over a network are monitored utilizing the firewall. Further, the traffic events are displayed utilizing the firewall. In use, at least one of the traffic events is traced utilizing the firewall. Moreover, a map of the trace is displayed for effectively conveying information about the traffic event.

In one embodiment, the traffic events may be displayed in an event log. Such event log may identify a time and an Internet Protocol (IP) address associated with the traffic events. Further, the traffic events may be organized based on times the traffic events are logged.

In another embodiment, the traffic events may include successful and/or blocked attempts to access the local computer. Further, the traffic event may be traced in response to a user request. In use, the tracing may include identifying a plurality of network segments traversed by the traffic event.

In still another embodiment, the map may take the form of a plurality of views of the network segments. For example, a geographical location of the network segments may be displayed upon the selection of a first one of the views. Further, a plurality of nodes of the network segments may be displayed upon the selection of a second one of the views. Still yet, a list of the network segments may be displayed upon the selection of a third one of the views.

By this design, a user may not only trace traffic events that are monitored and tracked utilizing a firewall, but also analyze the same using various types of map views (i.e. nodal, geographical, list, etc.).

DESCRIPTION OF THE PREFERRED EMBODIMENTS

Figure 1:
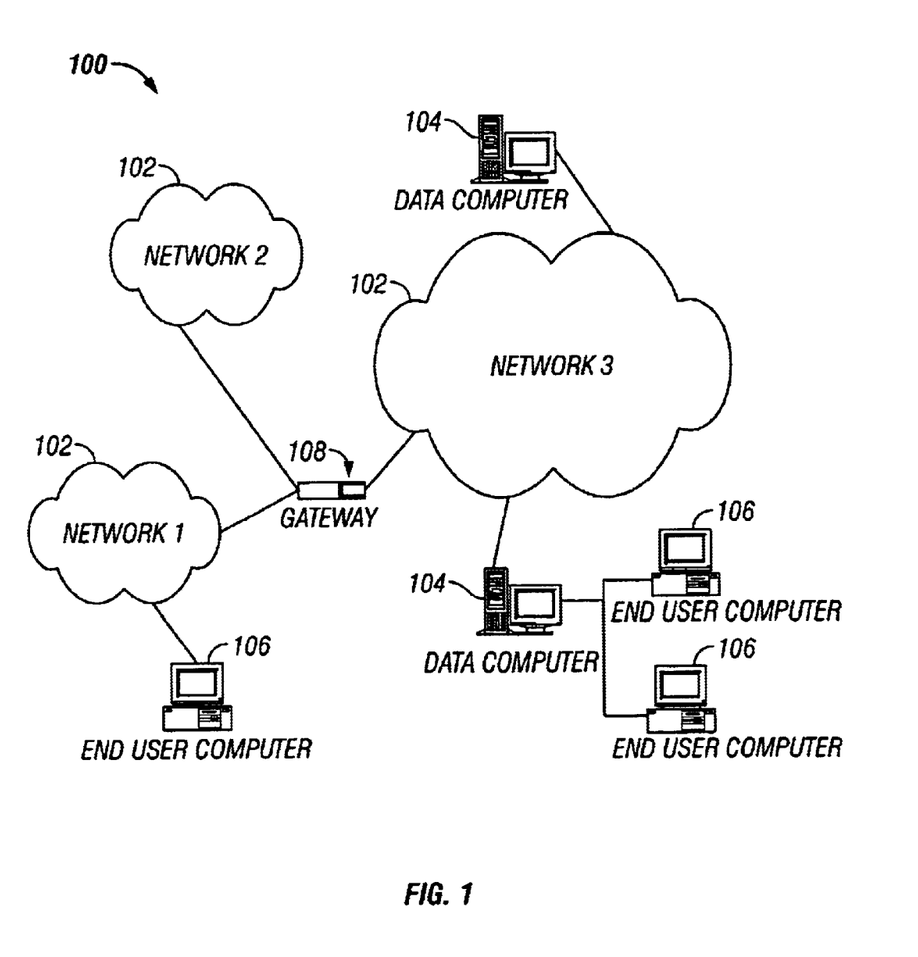
FIG. 1 illustrates an exemplary network environment, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wide area network (WAN) such as the Internet, etc.

Coupled to the networks 102 are data computers 104 which are capable of communicating over the networks 102.

Also coupled to the networks 102 and the data computers 104 is a plurality of end user computers 106. In the context of the present description, such end user computers 106 may include a web server, desktop computer, lap-top computer, hand-held computer, printer or any other type of hardware/ software network device. More detail regarding an exemplary embodiment of such data computers 104 and user computers 106 will be set forth hereinafter during reference to FIG. 2. A gateway 108 may optionally be coupled between the various computers.

Any one or more of the data computers 104 or user computers 106 may be equipped with a firewall. In one example, the firewall may include a software application installed directly on the data computers 104 or user computers 106 in the form of personal firewalls. Of course, other traditional approaches may also be employed. For example, a separate hardware component may be coupled between the computers and a network.

The firewall installed on the data computers 104 or user computers 106 may be equipped with the ability of tracing a traffic event. Initially, the firewall is executed on a local computer (i.e. end user computer, data computer, etc.). Next, traffic events between the local computer and a remote computer over a network are monitored utilizing the firewall. Further, the traffic events are displayed utilizing the firewall. In use, at least one of the traffic events is traced utilizing the firewall. Moreover, a map of the trace is displayed for effectively conveying information about the traffic event. More information relating to one exemplary embodiment that incorporates such techniques will be set forth hereinafter in greater detail.

Figure 2:
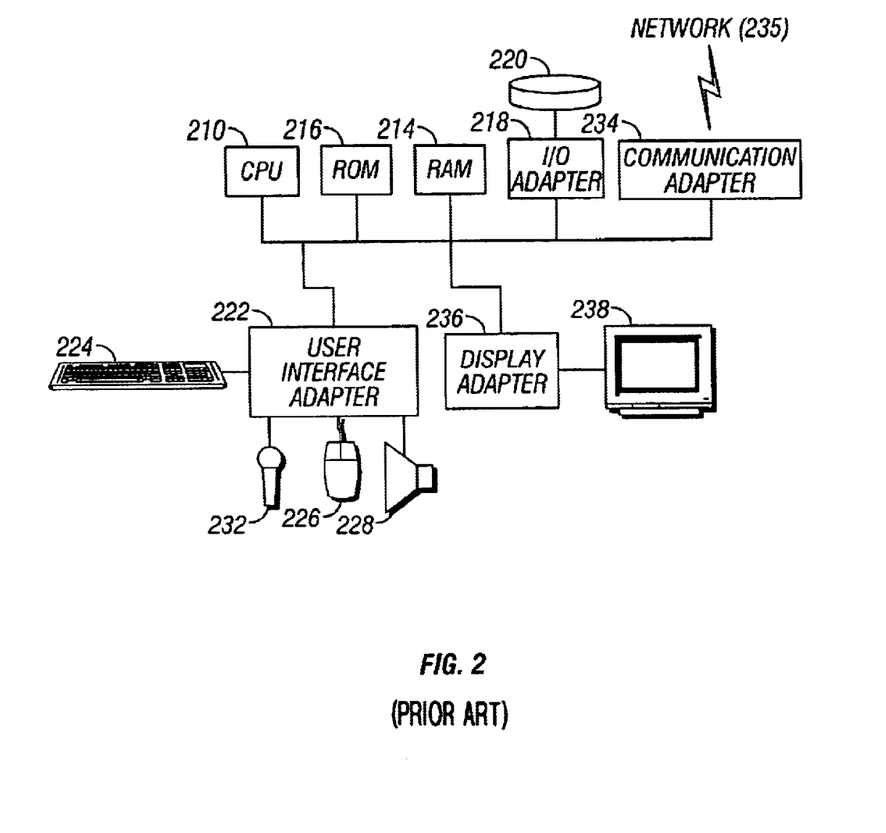
FIG. 2 shows a representative hardware environment associated with the computers of FIG. 1.

FIG. 2 shows a representative hardware environment that may be associated with the data computers 104 and/or end user computers 106 of FIG. 1, in accordance with one embodiment. Such figure illustrates a typical hardware configuration of a workstation in accordance with a preferred embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows NT or Windows/95 Operating System (OS), the IBM OS/2 operating system, the MAC OS, or UNIX operating system. It will be appreciated that a preferred embodiment may also be implemented on platforms and operating systems other than those mentioned. A preferred embodiment may be written using JAVA, C, and/or C++ language, or other programming languages, along with an object oriented programming methodology. Object oriented programming (OOP) has become increasingly used to develop complex applications.

Figure 3:
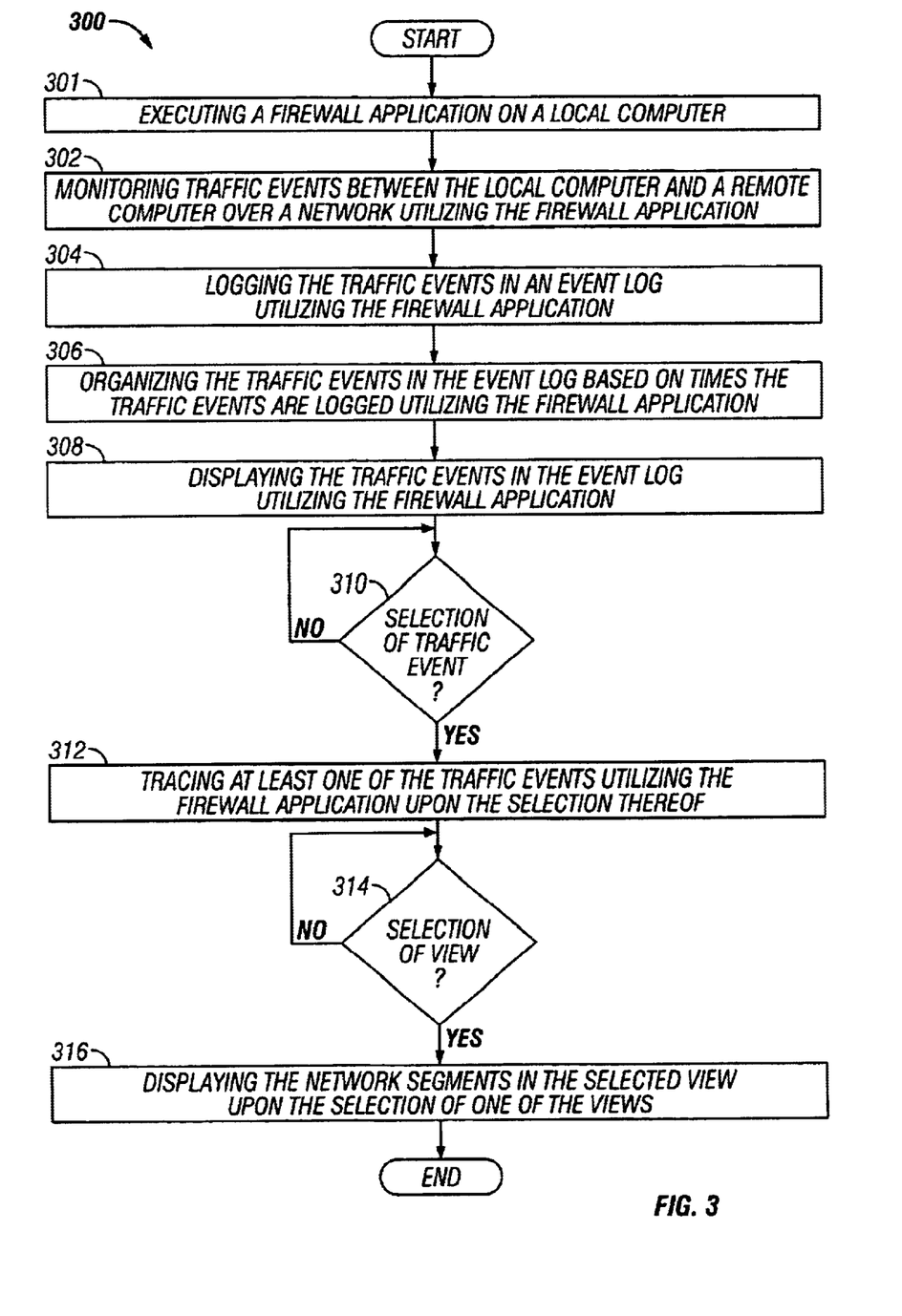
FIG. 3 is a flowchart of a method for tracing a traffic event utilizing a firewall, in accordance with one embodiment.

FIG. 3 is a flowchart of a method 300 for tracing a traffic event utilizing a firewall, in accordance with one embodiment. As an option, the present method 300 may be carried out in the context of the aforementioned firewall of the network architecture 100 of FIG. 1. Of course, however, the present method 300 may be executed in any desired context and environment.

As shown, a firewall is initially executed on a local computer in operation 301. As mentioned earlier, such firewall may include a software application installed directly on the computer in the form of a personal firewall. Of course, other traditional approaches (i.e. a separate hardware device coupled between the computer and a network) may also be employed.

In operation 302, traffic events between the local computer and a remote computer over a network (i.e. LAN. WAN, Internet, etc.) are then monitored utilizing the firewall. In the context of the present description, such traffic events may include successful and/or blocked attempts to access (i.e. communicate with) the local computer, and/or attempts of the local computer to access. (i.e. communicate with) a network.

It should be noted that the blocked attempts may include various types. One of the types of the blocked attempts may include blocked attempts of remote computers to access predetermined banned ports associated with the local computer. Further, one of the types of the blocked attempts may include blocked attempts of remote computers with a predetermined set of Internet Protocol (IP) addresses to access the local computer. Still yet, one of the types of the blocked attempts may include blocked attempts to access a network made by predetermined applications. By this design, the firewall acts to filter the traffic events.

As the traffic events are monitored, they are further logged in an event log utilizing the firewall. See operation 304. Such event log identifies and tracks a time and an Internet Protocol (IP) address associated with each of the traffic events, as well as any other desired event information (i.e. an application associated with the traffic event, etc.).

Next, in operation 306, the traffic events are organized in the event log based on times the traffic events are logged utilizing the firewall. For example, the traffic events logged today, this week, etc. may be organized in separate categories for organization purposes.

With the traffic events logged and organized, the traffic events are displayed in the event log utilizing the firewall. See operation 308. In one embodiment, the traffic events are displayed in a list format in each of the aforementioned categories. More information regarding on exemplary interface that lists the events will be set forth in greater detail during reference to FIG. 5.

Once listed, the traffic events may be selected by a user utilizing a mouse, keyboard, or any other input device. The selection of one of the traffic event by the user is then detected in decision 310. Upon the selection of one of the traffic events, such event is traced utilizing the firewall, as indicated by operation 312. Such trace identifies a plurality of network segments traversed by the traffic event, as well as a source of the traffic event.

In response to such selection, the network segments are displayed in a view selected in decision 314. It should be noted that the views may include a map. In the context of the present description, a map may refer to any graphical representation (i.e. topographical, nodal, geographical, etc.) of the network segments associated with the selected traffic event.

In one embodiment, the map view may take the form of a plurality of views. For example, a geographical location of the network segments may be displayed upon the selection of a first one of the views. Further, nodes of the network segments may be displayed upon the selection of a second one of the views. Still yet, a list of the network segments may be displayed upon the selection of the list view. More exemplary information regarding such views will be set forth in greater during reference to FIGS. 4 through 6.

Figure 4:
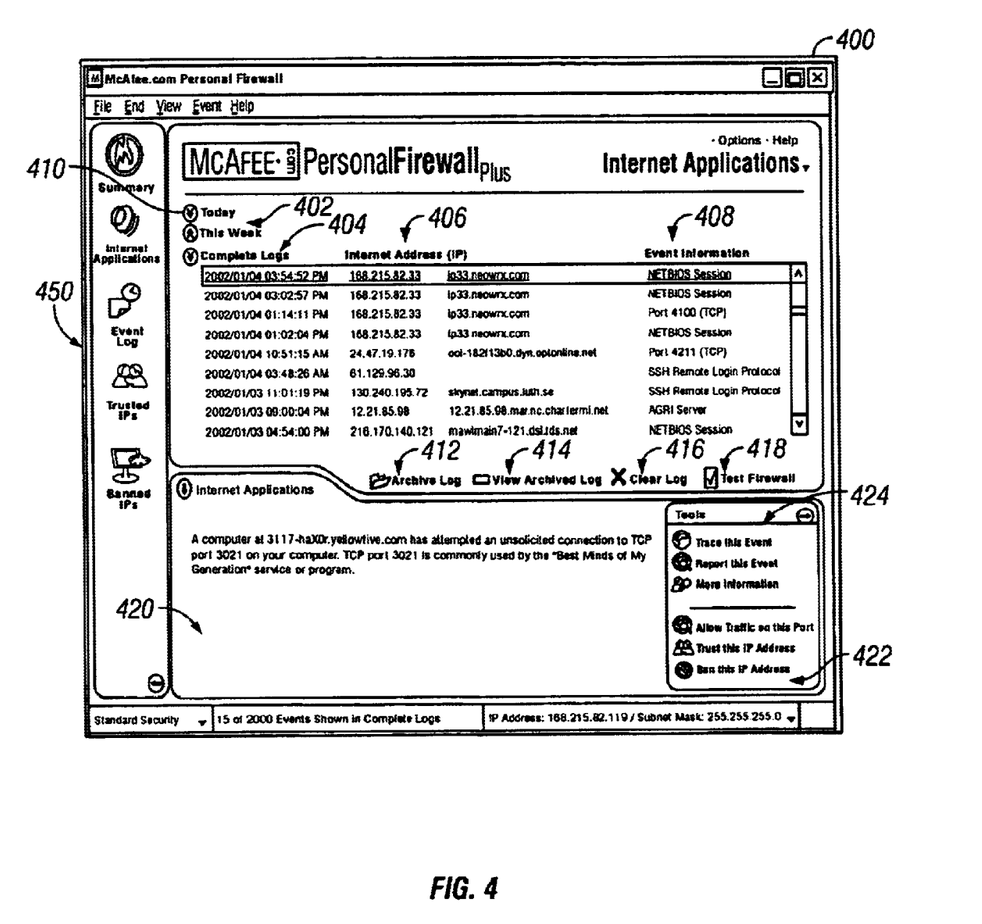
FIG. 4 illustrates an event log illustrating the various traffic events, in accordance with operation 308 of FIG. 3.

FIG. 4 illustrates an event log 400 illustrating the various traffic events, in accordance with operation 308 of FIG. 3. As shown, various categories 402 of traffic events are shown. For example, a "Today" category, a "This Week" category, as well as a "Total" category may be provided. Further, various information may be displayed regarding each event, such as the time and date 404 when the traffic event was logged, the associated Internet Protocol (IP) address 406, and other related event information 408. As mentioned earlier, any of the listed events in the event log 400 may be selected during use.

Additional features may also be provided. For example, the various lists of traffic events under each category 402 may be collapsed and expanded as desired by selecting icons 410. By this feature, a user may focus on a category of interest. As a further option, the event log 400 may be archived upon the selection of an archive icon 412. Still yet, an archived event log 400 may be access via a view archived log icon 414. The present event log 400 may even be cleared using a clear event log icon 416. A test icon 418 is also provided.

Upon the selection of any of the traffic events in the event log 400, a lower portion 420 of the event log 400 may be reserved for additional information relating to the selected event. Such information may include, but is not limited to applications associated with the selected event.

Still another portion 422 of the event log 400 may include a plurality of tools for processing a selected traffic event. For example, a trace icon 424 may be selected in accordance with operation 310 to initiate the tracing process of operation 312 of FIG. 3. Other features may include an option to record the selected event, identify additional information on the selected event, allow traffic on a port associated with the selected event, allow the receipt of traffic from an IP address associated with the selected event, and disallow the receipt of traffic from an IP address associated with the selected event. Of course, any desired functionality may be incorporated per the desires of the user.

As an option, a menu 450 may be displayed simultaneously in conjunction with the event log 400 for providing the user quick and efficient access to other optional features such as a summary page, a list of trusted and banned IP addresses, etc.

Figure 5:
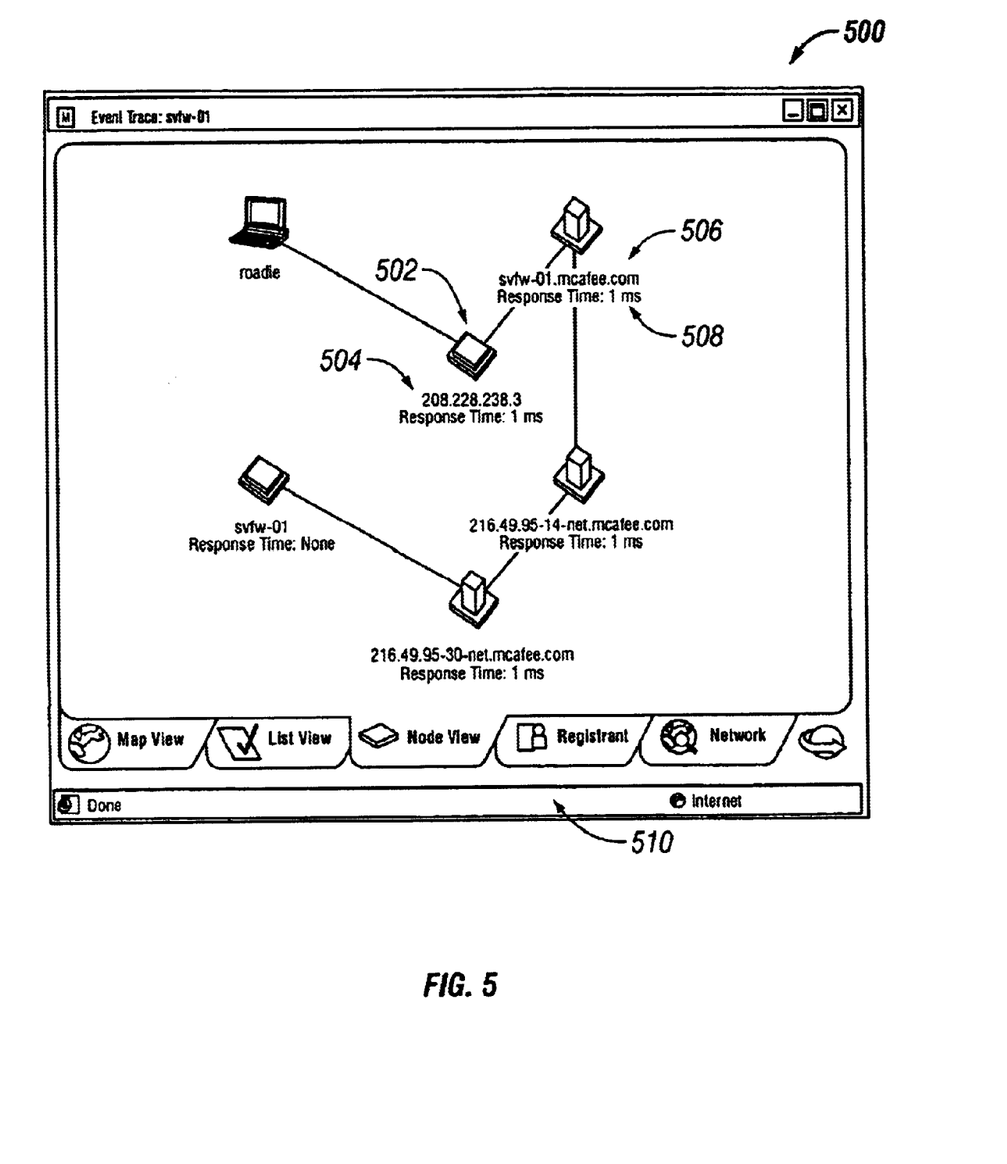
FIG. 5 illustrates one of the views (i.e. a node view) that the trace process is adapted for outputting, in accordance with operation 316 of FIG. 3.

FIG. 5 illustrates one of the views 500 (i.e. a node view) that the trace process is adapted for outputting, in accordance with operation 316 of FIG. 3. It should be noted that the present view is presented for illustrative purposes only, and any desired view may be displayed per the desires of the user.

As shown in FIG. 5, a plurality of interconnected nodes 502 are displayed between the local computer and a source of the selected traffic event. An IP address 504 is also shown corresponding to each of the nodes 502. Further shown is an administrator 506 associated with the IP address for textually identifying a corporate or personal entity associated with the IP address. Further shown is a response time 508 associated with each node 502.

As an option, a plurality of menu tabs 510 may be displayed simultaneously in conjunction with each of the trace views including the node view 500. As shown, the user may select between each of the various trace views by simply selecting the corresponding menu tab 510. For example, a user may select a list view which illustrates the various network segments in a form similar to the event log of FIG. 4. Further, a geographical view may be displayed in response to the selection of the associated menu tab 510.

Figure 6:
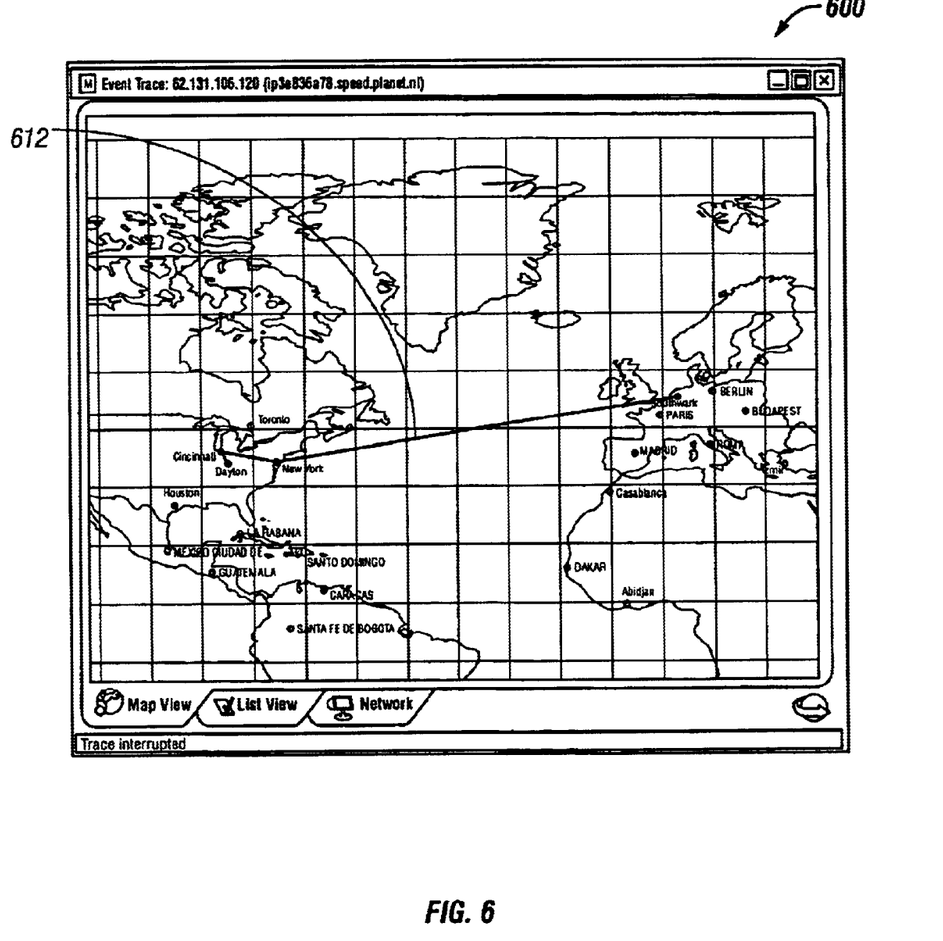
FIG. 6 illustrates another view (i.e. a geographical map view) that the trace process is adapted for outputting, in accordance with operation 316 of FIG. 3.

FIG. 6 illustrates another view 600 (i.e. a geographical map view) that the trace process is adapted for outputting, in accordance with operation 316 of FIG. 3. Again, the present view is presented for illustrative purposes only, and any desired view may be displayed per the desires of the user.

As shown, the present view 600 illustrates a geographical map where the various network segments are located, over which the selected traffic event traversed. For example, the geographical map view 600 may show a plurality of network segments 612 and the cities, states, and even countries that were traversed.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for tracing a traffic event utilizing a firewall, comprising:
   (a) executing a firewall on a local computer;
   (b) monitoring traffic events between the local computer and a remote computer over a network utilizing the firewall;
   (c) displaying the traffic events utilizing the firewall;
   (d) tracing at least one of the traffic events utilizing the firewall; and
   (e) displaying a world map with an illustration of the trace thereon utilizing the firewall.

2. The method as recited in claim 1, wherein the traffic events are displayed in an event log.

3. The method as recited in claim 2, wherein the event log identifies a time and an Internet Protocol (IP) address associated with the traffic events.

4. The method as recited in claim 2, wherein the traffic events are organized based on times the traffic events are logged.

5. The method as recited in claim 2, wherein the traffic events include attempts to access the local computer.

6. The method as recited in claim 1, wherein the at least one traffic event is traced in response to a user request.

7. The method as recited in claim 1, wherein the tracing includes identifying a plurality of network segments traversed by the traffic event.

8. The method as recited in claim 7, wherein the map includes the network segments.

9. The method as recited in claim 8, and further comprising displaying a plurality of views.

10. The method as recited in claim 9, wherein a geographical location of the network segments is displayed upon the selection of a first one of the views.

11. The method as recited in claim 10, wherein nodes of the network segments are displayed upon the selection of a second one of the views.

12. The method as recited in claim 11, wherein a list of the network segments are displayed upon the selection of a third one of the views.

13. A computer program product for tracing a traffic event utilizing a firewall, comprising:
   (a) computer code for executing a firewall on a local computer;

(b) computer code for monitoring traffic events between the local computer and a remote computer over a network utilizing the firewall;

(c) computer code for displaying the traffic events utilizing the firewall;

(d) computer code for tracing at least one of the traffic events utilizing the firewall; and (e) computer code for displaying a world map with an illustration of the trace thereon utilizing the firewall.

14. The computer program product as recited in claim 13, wherein the traffic events are displayed in an event log.

15. The computer program product as recited in claim 14, wherein the event log identifies a time and an Internet Protocol (IP) address associated with the traffic events.

16. The computer program product as recited in claim 14, wherein the traffic events are organized based on times the traffic events are logged.

17. The computer program product as recited in claim 14, wherein the traffic events include attempts to access the local computer.

18. The computer program product as recited in claim 13, wherein the at least one traffic event is traced in response to a user request.

19. The computer program product as recited in claim 13, wherein the tracing includes identifying a plurality of network segments traversed by the traffic event.

20. The computer program product as recited in claim 19, wherein the map includes the network segments.

21. The computer program product as recited in claim 20, and further comprising computer code for displaying a plurality of views.

22. The computer program product as recited in claim 21, wherein a geographical location of the network segments is displayed upon the selection of a first one of the views.

23. The computer program product as recited in claim 22, wherein nodes of the network segments are displayed upon the selection of a second one of the views.

24. The computer program product as recited in claim 23, wherein a list of the network segments are displayed upon the selection of a third one of the views.

25. A system for tracing a traffic event utilizing a firewall, comprising:

(a) logic for executing a firewall on a local computer;

(b) logic for monitoring traffic events between the local computer and a remote computer over a network utilizing the firewall;

(c) logic for displaying the traffic events utilizing the firewall;

(d) logic for tracing at least one of the traffic events utilizing the firewall; and (e) logic for displaying a world map with an illustration of the trace thereon utilizing the firewall.

26. A method for tracing a traffic event utilizing a firewall, comprising:

(a) executing a firewall on a local computer;

(b) monitoring traffic events between the local computer and a remote computer over a network utilizing the firewall;

(c) displaying the traffic events utilizing the firewall;

(d) tracing at least one of the traffic events utilizing the firewall;

(e) displaying a geographical location of a plurality of network segments associated with the traffic event on a world map upon the selection of a first one of a plurality of views utilizing the firewall;

(f) displaying a plurality of nodes of the network segments upon the selection of a second one of the views utilizing the firewall; and (g) displaying a list of the network segments upon the selection of a third one of the views utilizing the firewall.

27. A method for tracing a traffic event utilizing a firewall, comprising:

(a) executing a firewall on a local computer;

(b) monitoring traffic events between the local computer and a remote computer over a network utilizing the firewall;

(c) logging the traffic events in an event log utilizing the firewall, wherein the event log identifies a time and an Internet Protocol (IP) address associated with the traffic events;

(d) organizing the traffic events in the event log based on times the traffic events are logged utilizing the firewall;

(e) displaying the traffic events in the event log utilizing the firewall;

(f) detecting the selection of one of the traffic event by a user;

(g) tracing at least one of the traffic events utilizing the firewall upon the selection thereof, wherein the tracing identifies a plurality of network segments traversed by the traffic event;

(h) detecting the selection of one of a plurality of views by the user; and (i) displaying the network segments in the selected view upon the selection of one of the views, wherein one of the views includes a world map with an illustration of a trace thereon.

28. A method for geographically tracing a traffic event utilizing a personal firewall, comprising:

monitoring traffic events between a local computer and a remote computer over a network utilizing a personal firewall;

displaying the traffic events in an event log utilizing the personal firewall, wherein the traffic events are organized based on a time associated therewith;

tracing at least one of the traffic events utilizing the personal firewall; and displaying the trace on a world map utilizing the personal firewall, wherein the at least one traffic event is traced in response to a user request.

29. A computer program product for geographically tracing a traffic event utilizing a personal firewall, comprising:

computer code for monitoring traffic events between a local computer and a remote computer over a network utilizing a personal firewall;

computer code for displaying the traffic events in an event log utilizing the personal firewall, wherein the traffic events are organized based on a time associated therewith;

computer code for tracing at least one of the traffic events utilizing the personal firewall; and computer code for displaying the trace on a world map utilizing the personal firewall, wherein the at least one traffic event is traced in response to a user request;

wherein the trace is shown to involve a plurality of displayed network segments shown to be spanning different cities of different countries displayed on the world map.

* * * * *